United States Patent [19]
Mintgen et al.

[11] Patent Number: 6,112,867
[45] Date of Patent: Sep. 5, 2000

[54] DETENT DEVICE BETWEEN OBJECTS THAT ARE MOVABLE RELATIVE TO ONE ANOTHER

[75] Inventors: Rolf Mintgen, Thür; Castor Fuhrmann, Brachtendorf; Oliver Greb, Neunkirchen, all of Germany

[73] Assignee: Stabilus GmbH, Koblenz, Germany

[21] Appl. No.: 09/176,401

[22] Filed: Oct. 21, 1998

[30] Foreign Application Priority Data

Oct. 24, 1997 [DE] Germany ............................ 197 47 071

[51] Int. Cl.$^7$ ..................................................... F16F 9/32
[52] U.S. Cl. ........................................ 188/300; 267/64.12
[58] Field of Search .............................. 188/300, 322.15; 267/64.12, 64.11, 64.13

[56] References Cited

U.S. PATENT DOCUMENTS

| | | | |
|---|---|---|---|
| 2,808,904 | 10/1957 | O'Conner et al. ..................... | 188/300 |
| 3,479,890 | 11/1969 | Howell . | |
| 3,762,514 | 10/1973 | Freitag . | |
| 4,373,707 | 2/1983 | Molders .............................. | 267/64.12 |
| 4,784,375 | 11/1988 | Wirges ................................ | 267/64.12 |
| 4,993,522 | 2/1991 | Wagner . | |
| 5,116,028 | 5/1992 | Mintgen et al. ..................... | 267/64.12 |

FOREIGN PATENT DOCUMENTS

| | | |
|---|---|---|
| 19 89 658 | 7/1968 | Germany . |
| 20 24 749 | 12/1971 | Germany . |
| 39 02 882 | 8/1990 | Germany . |
| 12 28 115 | 11/1996 | Germany . |

*Primary Examiner*—Robert J. Oberleitner
*Assistant Examiner*—Pamela J. Lipka
*Attorney, Agent, or Firm*—Baker Botts L.L.P.

[57] ABSTRACT

A detent device for locking first and second elements that are movable relative to one another includes a first subassembly connected to a first element and a second subassembly connected to the second element. A first locking mechanism of the detent device can be controlled at will by use of an actuating mechanism. The first locking mechanism is subordinated to a second locking mechanism that acts independently of the first locking mechanism as soon as a threshold value of the relative speed of the two subassemblies of the detent device is exceeded. The second locking mechanism includes a first locking element and a second locking element, the first locking element being functionally associated with the first subassembly and the second locking element being functionally associated with the second subassembly. The first and the second locking elements form a clutch. In addition, the locking mechanism can also have two states of locking actuation.

3 Claims, 7 Drawing Sheets

DETENT DEVICE BETWEEN OBJECTS THAT ARE MOVABLE RELATIVE TO ONE ANOTHER

BACKGROUND OF THE INVENTION

The invention concerns a detent device for locking first and second elements that are movable relative to one another against movement.

A detent device of this nature is known, for example, from DE 2,024,749 A1. A first locking mechanism is formed by a stop valve in the piston of the detent device. The detent device can be locked at will via a valve tappet within the hollow piston rod. If the dynamic pressure increases within the cylinder of the detent device that results from a load exceeding the usual holding force, then a second locking mechanism takes effect. The second locking mechanism consists of a one-way restrictor within a separating chamber of the cylinder. The separating chamber reduces the stroke length relative to a comparable cylinder without a separating chamber.

SUMMARY OF THE INVENTION

The object of the present invention is to implement further solutions for this type of a detent device in an advantageous way.

The object is attained, in accordance with the invention in that the additional locking mechanism comprises a first locking element and a second locking element. The first locking element is functionally associated with a first subassembly, and the second locking element is functionally associated with a second subassembly. The first and the second locking elements form a clutch. The advantage of a clutch is that it can transmit very large forces. Moreover, the clutch is a mechanical component, so that in the case of a failure of the first locking mechanism, for example a lockable gas spring, a system change of the locking mechanisms can be effected, which increases the reliability of the detent device.

In order to produce a strict separation of the "normal operation" and "peak load" functional areas, the clutch of the locking mechanism is spring-loaded in the direction of opening. During actuation in normal operation, the spring forces do not have to be overcome, so that no loss of convenience is perceivable. For this purpose, the spring force is greater than the force required for adjustment of the unlocked detent device in normal operation.

A circumstance that it is necessary to consider when using an additional locking mechanism is that a motion of the two elements to be moved is translated into a relative motion of the locking elements used. If one uses only a single self-contained assembly, it is especially advantageous if the first and the second locking elements are offset with respect to one another in a rotary motion during an adjusting movement of the detent device. If one starts with an axial adjustment motion of the subassemblies of the detent device, simply from the type of motion of the components that can be actuated in normal adjustment operation and under a peak load, one obtains an unambiguous distinguishing characteristic and a type of performance split in which the first locking mechanism engages on one "branch" and the second locking mechanism engages on a second "branch."

In order to meet this requirement, a transmission is constructed between a locking element and a subassembly, which translates an axial motion of the subassembly into a rotary motion of the locking element.

With a view toward a small installation space, the transmission is preferably implemented as a geared spindle drive.

Thus, the cylinder of the subassembly has an external thread that is engaged by one of the locking elements, which is arranged concentrically to said subassembly.

In a further embodiment, the second locking element is in turn arranged concentrically to the first locking element. The outer locking element forms the housing for the detent device. One thereby obtains a compact device whose mechanism is protected on the outside.

In order to achieve the largest possible clutch surfaces, clutch surfaces are constructed on the faces between the first and the second locking elements. Moreover, the clutch surfaces can have teeth.

Assuming a detent device for a vehicle seat, the back rest must be held in both directions. Objects or other persons that act on the back rest from behind in a collision must be restrained just as securely as the recoil motion of the person on the seat so that the clutch surfaces are constructed on both faces which face one another of the locking elements, and thus can be equally effective in both directions.

In one embodiment, the first locking mechanism consists of a cone that acts in conjunction with an appropriately shaped mating surface. Here, the mating surface of the first locking element is part of the sleeve that is rotatable in the cylinder.

In addition, the first subassembly consists of a piston on a piston rod, which is axially movable within a cylinder as a second subassembly. The piston rod is nonrotatably guided to the cylinder, and the piston and also a sleeve rotatable within the cylinder form the first and the second locking elements of the additional locking mechanism. The sleeve offers the advantage of good utilization of space, since the outside contours of the sleeve are identical to the cylinder of the detent device. The sleeve may have two faces that can be used as clutch surfaces.

For reasons of convenience, the adjusting motion of the detent device should be assisted. It is advantageous, especially with purely mechanical detent devices, if the piston is acted upon by the pressure of a spring that supplies an adjustment force for normal operation.

In an alternative embodiment, the locking mechanism has a locking element that travels an actuation distance for the unlock position. Above a load of the two subassemblies, the actuation distance is overcome and an additional lock position is assumed. Insofar as the application permits, additional locking means can be omitted if the actuation distance can be utilized as a characteristic for the difference between normal operation and peak load. The structure of the detent device becomes significantly simpler.

Thus, for example, a shaft forms a part of a geared spindle drive, and a connection to one of the elements that are movable relative to one another forms an additional part of the geared spindle drive. The shaft has a clutch disk upon which can be placed at will a clutch plate of the first locking element and which can assume the first lock position. At the end of the actuation distance the clutch disk contacts the clutch surface of the locking element and assumes a further lock position.

For reasons of convenience, the clutch disk is restrained between the clutch plate and a clutch lining of the housing in the first lock position. Thus, two pairs of friction surfaces are available, which numerically double the locking force in comparison to a clutch with a clutch plate and a clutch disk used on one side. However, this effect can also be used in that one reduces the preload force of the clutch and thus reduces the disengagement force.

In a further embodiment, a relative motion of the first and the second elements causes a swiveling motion of the locking elements of the second locking mechanism. The locking elements work together as a centrifugal clutch. The advantage of this solution is that one can retain an existing detent element and retrofit a centrifugal clutch. This embodiment is of particular interest when the two elements that are movable relative to one another are connected to one another through a swivel axis, and the swivel axis carries the centrifugal clutch.

In yet another embodiment, one subassembly is composed of a cylinder and the other subassembly is composed of a piston rod and a piston that divides the cylinder into two working chambers. A flow connection in the piston between the two working chambers can be closed at will via the first locking mechanism. The flow connection in the piston has a dynamic pressure valve that blocks the flow connection above a defined dynamic pressure independently of the state of actuation of the locking mechanism. This solution is especially compact, since an assembly existing in principle can be retrofitted.

In order to make the spring collar lockable for both working directions, flow passes through the flow connection in both directions. At least one dynamic pressure valve is provided on at least one end of the flow connection.

Thus, for example, the dynamic pressure valve is implemented as a tube membrane that locks in one direction and is implemented at both ends of the flow connection. The locking of the dynamic pressure valve can take effect in each direction of flow into the flow connection. A tube membrane can control several flow connections or their openings simultaneously.

Alternatively, the dynamic pressure valve may have a valve closure body, a valve closure surface and an opening spring. One can also construct a dynamic pressure valve in such a way that the valve closure body is float mounted between two valve surfaces. Both directions of flow can then be controlled with one valve closure body.

DESCRIPTION OF THE DRAWINGS

Embodiments of the invention will be described with the help of the accompanying drawings, in which.

DESCRIPTION OF THE EMBODIMENTS

Figure 1:
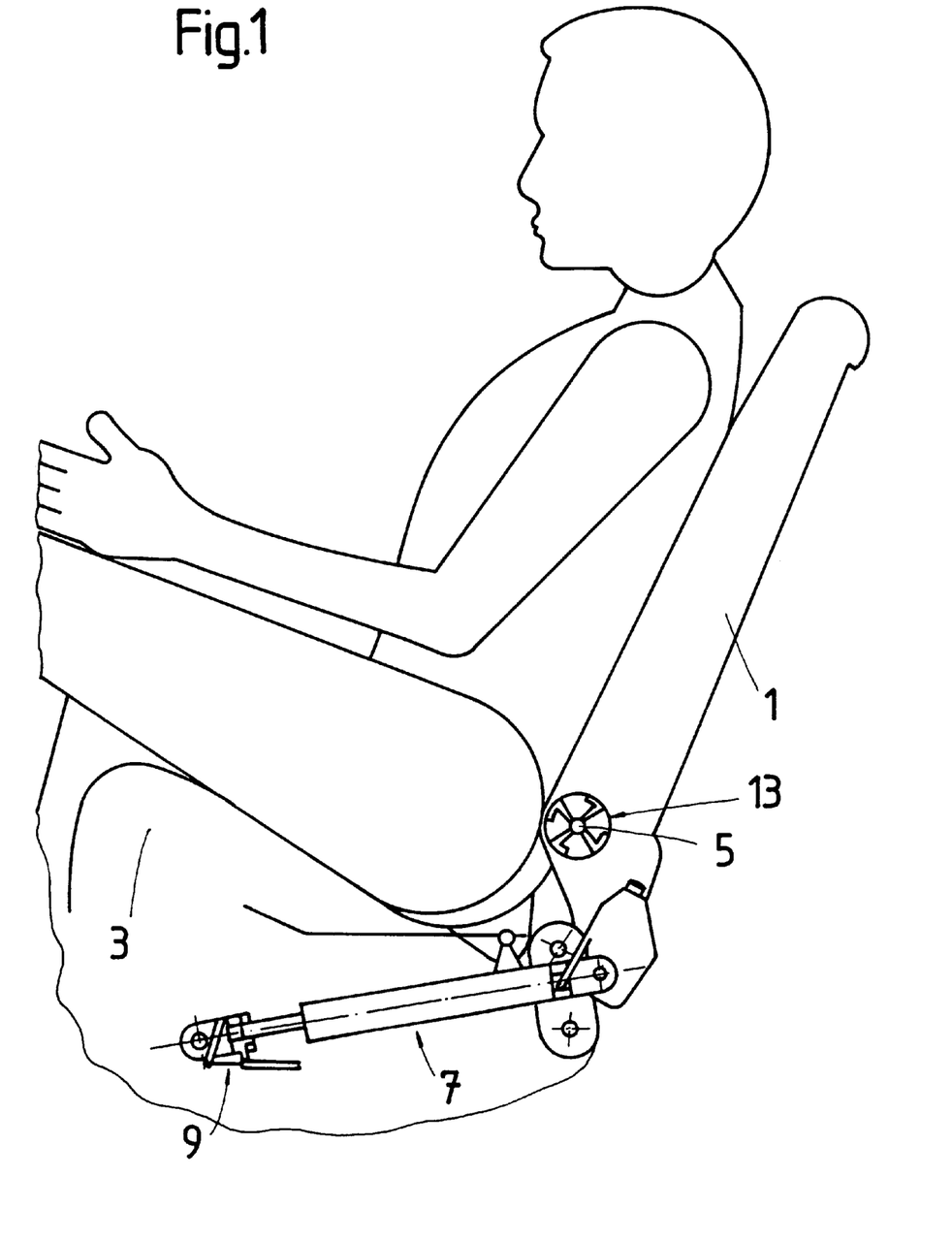
FIG. 1 shows an example of an installation and application situation.

FIG. 1 shows a vehicle seat with a back rest as a first element 1 and a seat bottom as a second element 3. The two elements 1 and 3 are connected to one another via a swivel axis 5 and are movable relative to one another around this swivel axis.

With a view to comfortable back rest adjustment, the vehicle seat has a detent device 7 which can be locked or unlocked at will by means of an actuating device 9, of which only a Bowden cable is illustrated, in order to set and lock a new back rest position. For example, an assembly with a first locking mechanism 11 (see FIG. 2), as is known from DE 3,902,882 A1 (Hydro-Bloc), can be used as a detent device. One might think that a single detent device is adequate, but a situation cannot be ruled out in which the detent device is opened to adjust the back rest and an accident occurs at the same time, causing a short term peak load to act on the detent device. A safety belt can only be fully effective if the vehicle seat maintains its position against the safety belt. The detent device has special significance when a so-called integral seat is used in which the safety belt is attached directly to the seat. So that the circumstance described cannot occur, the detent device has a second locking mechanism 13 in the form of a centrifugal clutch that is carried by the swivel axis 5. The second locking mechanism works independently of the locking mechanism in the assembly 7. Furthermore, the second locking mechanism functionally overrides the first one, and can thus lock the back rest if the first locking mechanism in the assembly is open.

Figure 2:
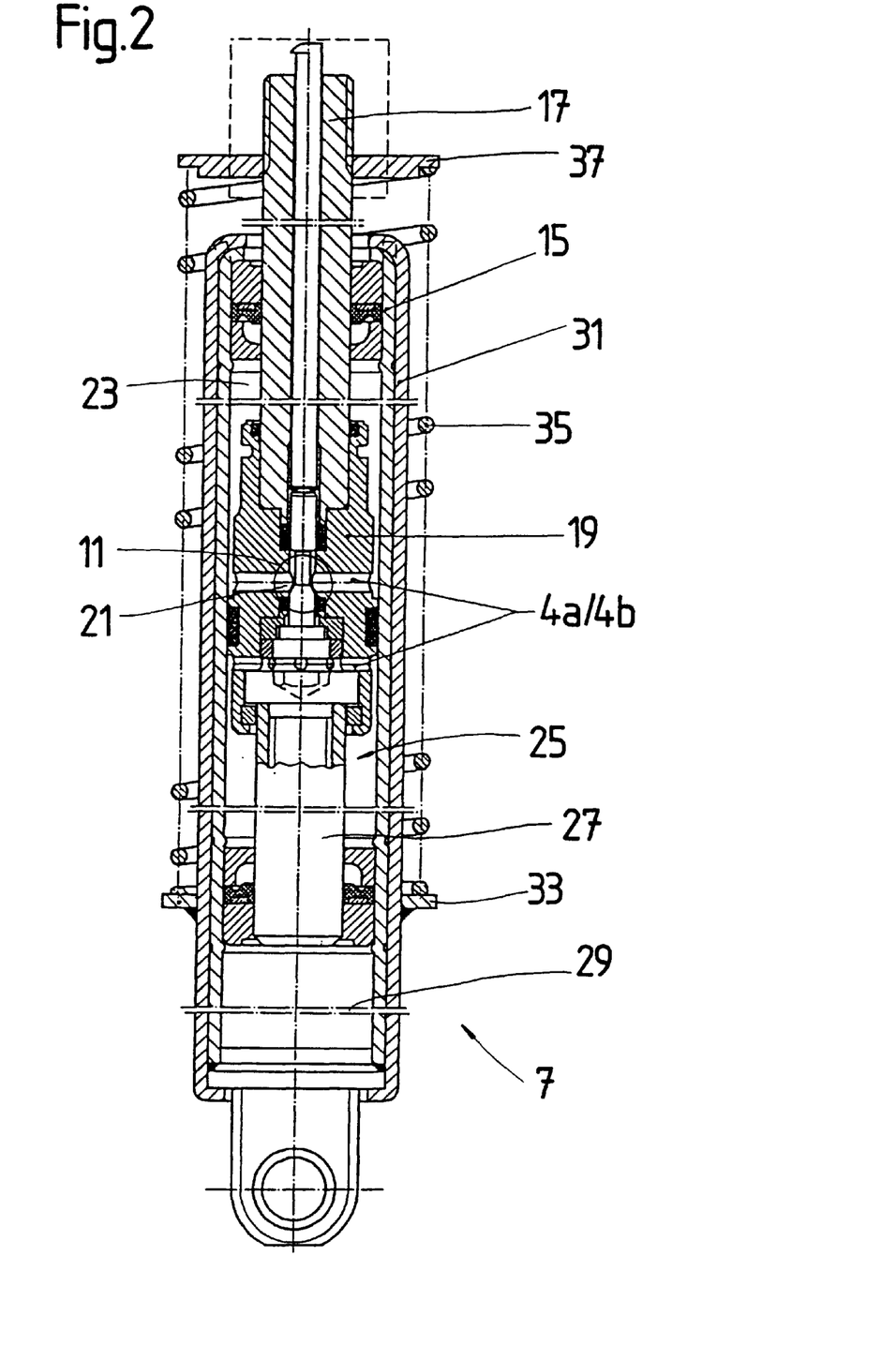
FIG. 2 is a longitudinal cross-sectional view of a first embodiment of a detent device.

FIG. 2 shows a detent device 7 that has a cylinder 15 as a first subassembly, in which is arranged to be axially movable a piston rod 17 with a piston 19 as a second subassembly. The piston has a flow connection 21 between the two working chambers 23 and 25 separated by the piston. By means of an actuating mechanism (not shown), the first locking mechanism 11 constructed in the form of a valve tappet can lock at will the flow connection 21. In addition, the piston 19 has a pin-shaped extension 27 with the same diameter as the piston rod, that extends into an open chamber 29 so that the two working chambers 23 and 25 change their volumes to the same degree in opposite directions.

The cylinder 15 receives an outer protective tube 31 that has a spring collar 33 for a compression spring 35 that bears against another spring collar 37 on the piston rod 17 and thus exerts a preloading force on the piston rod so that the piston rod is biased such as to extend out of the cylinder.

Figure 3:
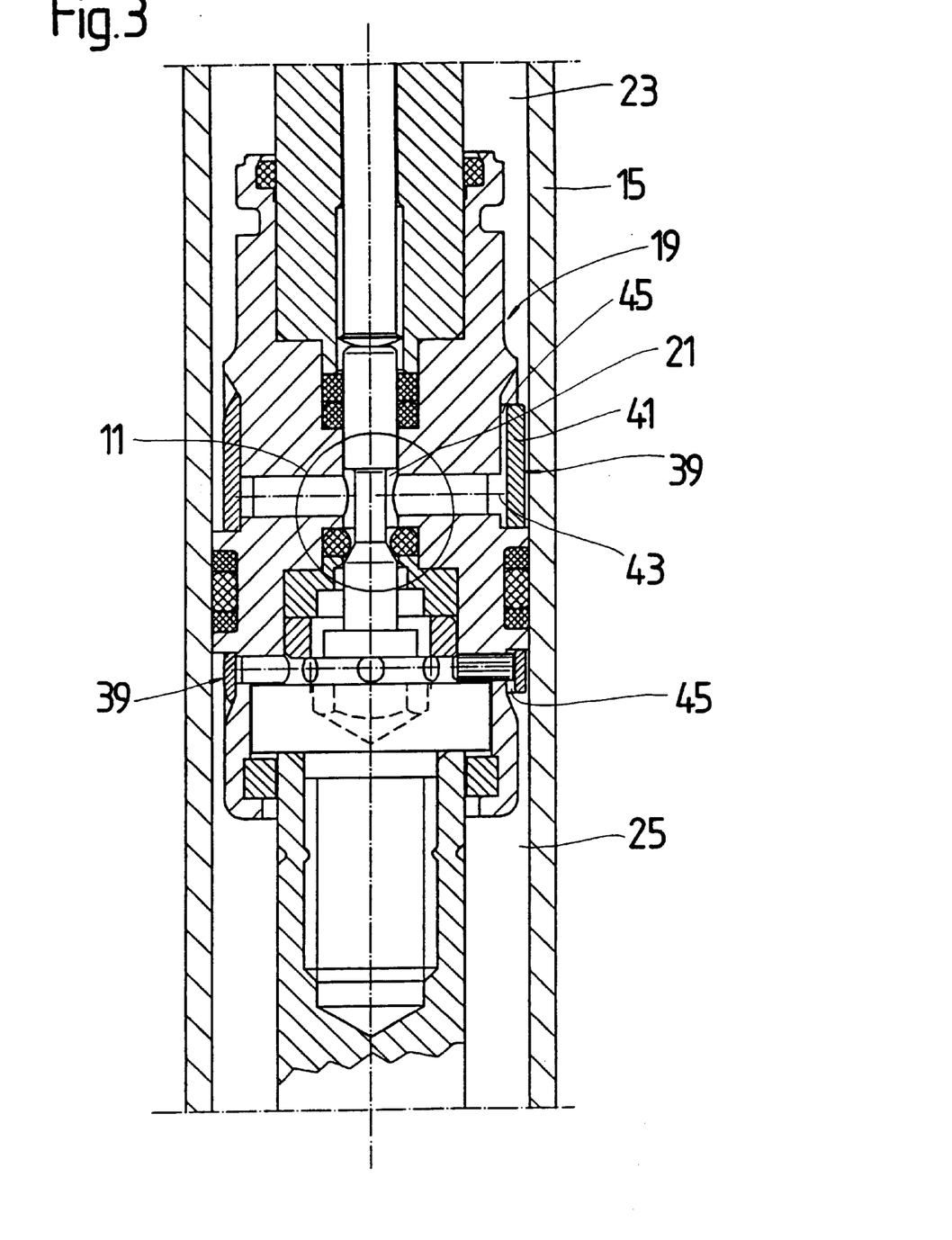
FIG. 3 is a detail cross-sectional view of the first embodiment.

FIG. 3 shows an enlarged view of the piston 19 of the detent device 7 from FIG. 2. A dynamic pressure valve 39, consisting of a simple elastic tube body 41, which only partially seals the outlet opening 43, is located at the ends of the flow connections 21 between the working chambers 23 and 25. A residual cross section 45 makes possible flow for normal operation of the detent device. In the event of a sudden dynamic pressure, the elastic tube body rests against the outlet openings 43 and closes them, since the surface exposed to pressure in the direction of the working chamber is larger than the cross section of the flow connection. As a result of the series arrangement of the dynamic pressure valves 39 with the first locking mechanism 11, a locking effect can even be achieved when the first locking mechanism is open.

Figure 4A:
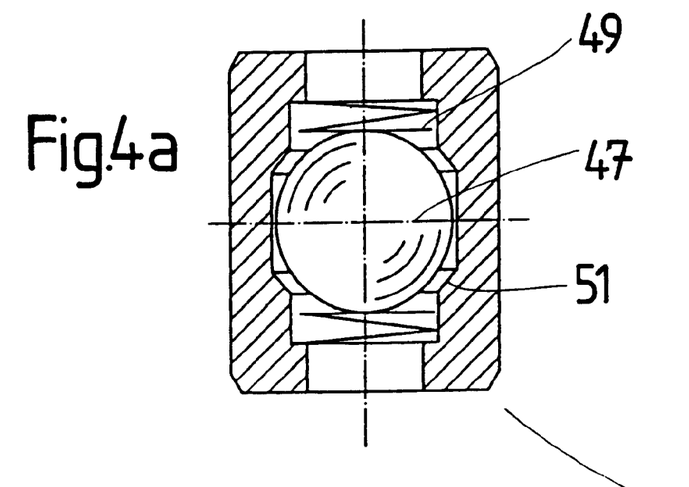
FIG. 4a is a cross-sectional view of one form of dynamic pressure valve.
Figure 4B:
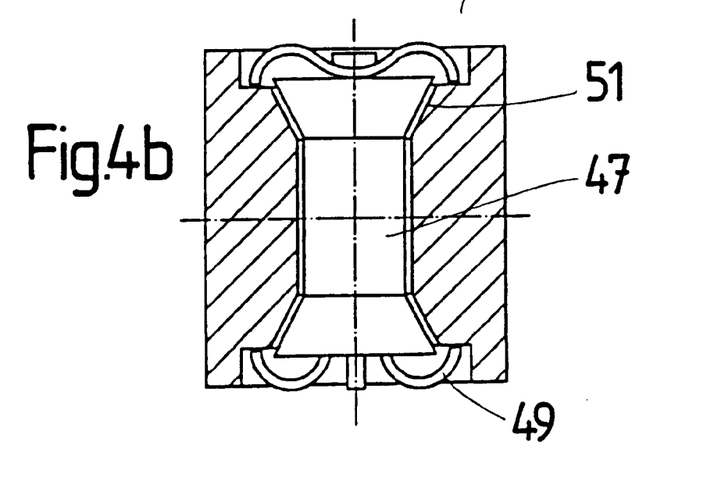
FIG. 4b is a cross-sectional view of another form of dynamic pressure valve.

Of course, dynamic pressure valves 39 can also be used instead of the elastic tube body in the embodiments in accordance with FIGS. 4a and 4b, in which a valve closure body 47 is float mounted between two valve closure surfaces 51 by opening springs 49. As soon as a dynamic pressure is present above a threshold value, the valve closure body is pressed against one of the valve closure surfaces and thus prevents flow through the flow connection 21 (FIG. 2). In FIG. 2, the possible connection points for the valves in accordance with FIGS. 4a and 4b are designated with 4a and 4b.

Figure 5:
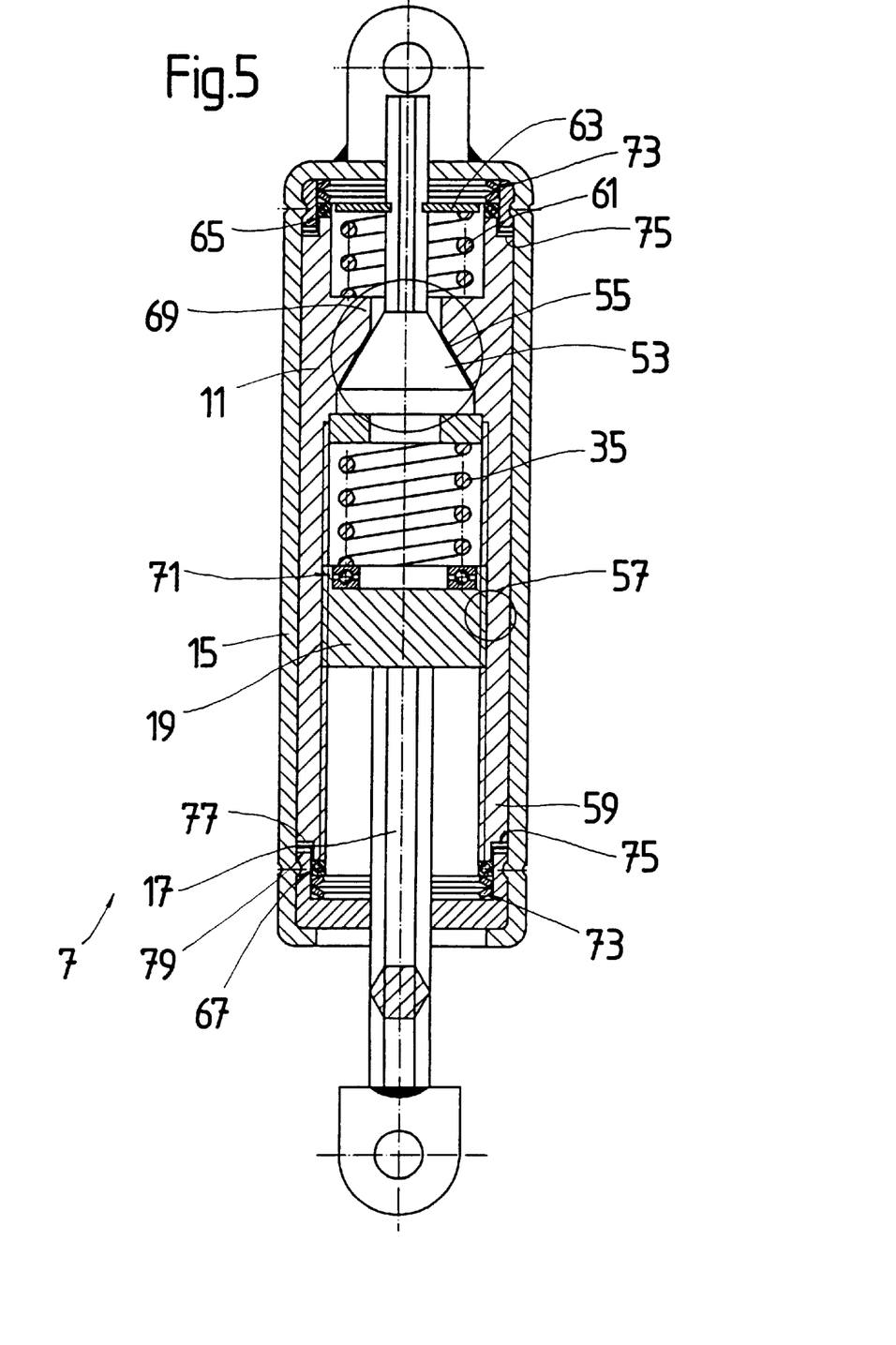
FIGS. 5 through 7 are longitudinal cross-sectional views of other embodiments of detent devices.

FIG. 5 shows a detent device 7 with a mechanical first locking mechanism 11, which consists of a cone 53 and a corresponding mating surface 55. The cone is added to the cylinder 15 as the first subassembly, and the mating surface 55 is added to a second subassembly comprising the piston rod 17 with a piston 19. The piston stands in connection with a sleeve 59 via a movement thread 57. The actuating device 9 passes through the cylinder 15 at one end. The actuating device always presses the cone against the mating surface by means of a return spring 61 that is braced between the sleeve and a support plate 63, thus allowing the first locking mechanism 11 to take effect. As a result, the first locking mechanism is closed as a rule.

The piston rod 17 is guided nonrotatably but with the capability of axial motion in the cylinder 15; in contrast, the sleeve 59 is supported for rotation relative to the piston and to the cylinder at its ends by bearings 65 and 67. The piston rod, which is profiled in its longitudinal direction, is retained in an inter-locking fashion in the circumferential direction by the cylinder. Upon a movement of the piston rod, its stroke movement is converted through the movement thread 57 into a rotary motion of the sleeve 59, by which means the sleeve forms a geared spindle drive with the piston rod. The sleeve has a base 69, which in turn has the mating surface 55 for the cone 53. The compression spring 35 presses against the piston 19 and thus exerts a force which loads the piston rod in the direction of extension. The compression spring 35 is separated from the piston by an axial bearing 71 so that a rotary motion of the compression spring is not transmitted to the piston.

The sleeve is, on the one hand, rotatable relative to the cylinder by means of the bearings 65 and 67, but is float mounted and is defined by springs or spring stacks acting on both sides. The sleeve 59 can be axially displaced relative to cylinder 15 within the scope of spring travel. End faces 75 of the sleeve are provided with teeth 77, which can engage meshing teeth 79, which are fixed in position relative to cylinder 15, as soon as the sleeve has traversed a specific displacement distance.

In the normal case of adjustment, the cone 53 is lifted away from the mating surface 55 of the sleeve 59 against the force of the return spring 61 by the actuating mechanism 9. The piston rod 17 can be shifted axially, by which means the sleeve is set into rotary motion but remains axially in the same position. As soon as the cone is in contact again, the return spring exerts a frictional force between the cone and the mating surface. The sleeve can no longer turn. As a result, the geared spindle drive/piston rod/piston/movement thread/sleeve is locked.

In the case of a force peak between the cylinder and the piston rod, for example in an application of the detent device as known from the state of the art, the sleeve 59 is pushed by the piston 19 on the piston rod 17 in the direction of the meshing teeth 79 of the cylinder 15. The direction of the piston rod's motion is unimportant here, since teeth are constructed at both faces of the sleeve. The force of the springs 73, which act axially on the sleeve, is overcome so that the teeth of both parts mesh. The sleeve 59 therefore represents a first locking element and the cylinder 15 a second locking element, where both locking elements form a clutch. The forces of the springs acting on the ends are many times greater than the force of the return spring 61. Consequently, the springs preload the clutch in the direction of opening.

Figure 6:
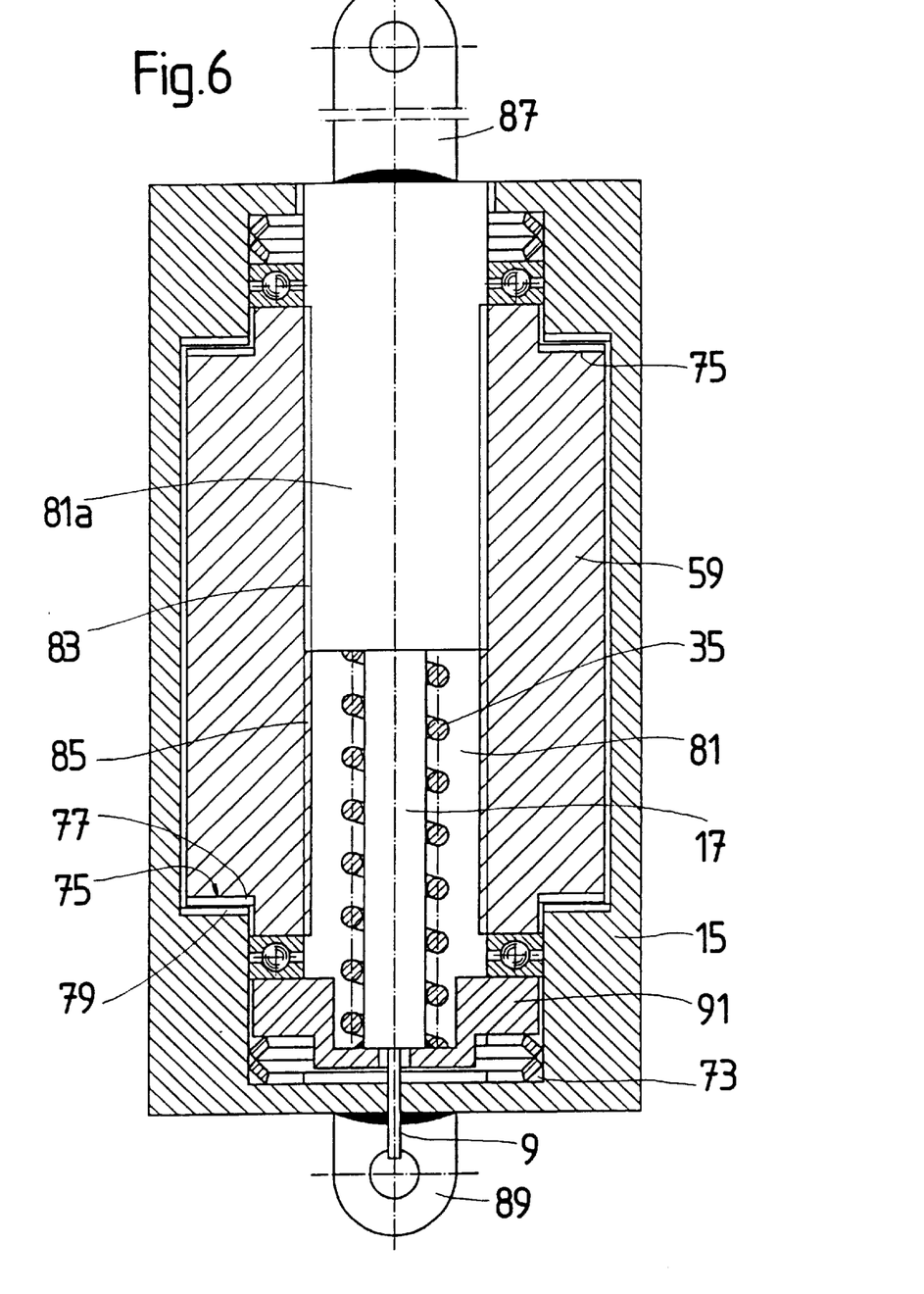

The embodiment in accordance with FIG. 6 corresponds in its principle of operation to the second locking mechanism of the embodiment in accordance with FIG. 5. Again the sleeve 59 as the first locking element is axially float mounted, where the springs 73 take over positioning. Arranged coaxial to the spring is a lockable piston/cylinder assembly 81, for example as known from DE 3,902,882. The cylinder 81a of the piston/cylinder assembly 81 has an external thread 83 that engages in an internal thread 85 of the sleeve 59. A connecting member 87 of the detent device 7 is attached to the cylinder 81a of the piston/cylinder assembly 81.

The sleeve 59 and also the piston/cylinder assembly 81 are enclosed by the cylinder 15 or the second locking element so that the second locking element forms a housing. An additional connecting member 89 is fastened to the second locking element. No relative rotary motion takes place between the cylinder 81a and the piston rod 17. The connecting member 87 on the cylinder 81a holds the cylinder 81a and the piston rod 17 against a plate 91, which in turn is fixed relative to the connecting member 89 of the second locking element 15.

In normal operation for adjustment, the axial motion of the piston rod 17 relative to the cylinder 81a can be stopped via the actuating device 9 of a hydraulic or pneumatic first locking mechanism that is not shown. As a result, the detent device is locked. Otherwise, the cylinder 81a can be moved relative to the piston rod 17, where this movement is transmitted by the external thread 83 of the cylinder 81a to the internal thread 85 of the sleeve 59, so that the sleeve can execute a rotary motion.

In cases of emergency with force peaks, the sleeve 59 is displaced axially relative to the housing 15 independently of the actuation state of the first locking mechanism in the piston/cylinder assembly, where the springs 73 are overcome and the face clutch surfaces 75 or the teeth 77 and the meshing teeth 79 engage. One can additionally assist the function if one uses an assembly as in FIG. 3 or FIG. 4 since the dynamic pressure valves support the locking effect of the piston/cylinder assembly 81.

In this embodiment, the second locking mechanism operates in both directions of movement of the piston rod. The compression spring 35 can support the extending movement of the piston rod. Alternatively, a pressurized gas cushion can also act in cylinder 81a.

Figure 7:
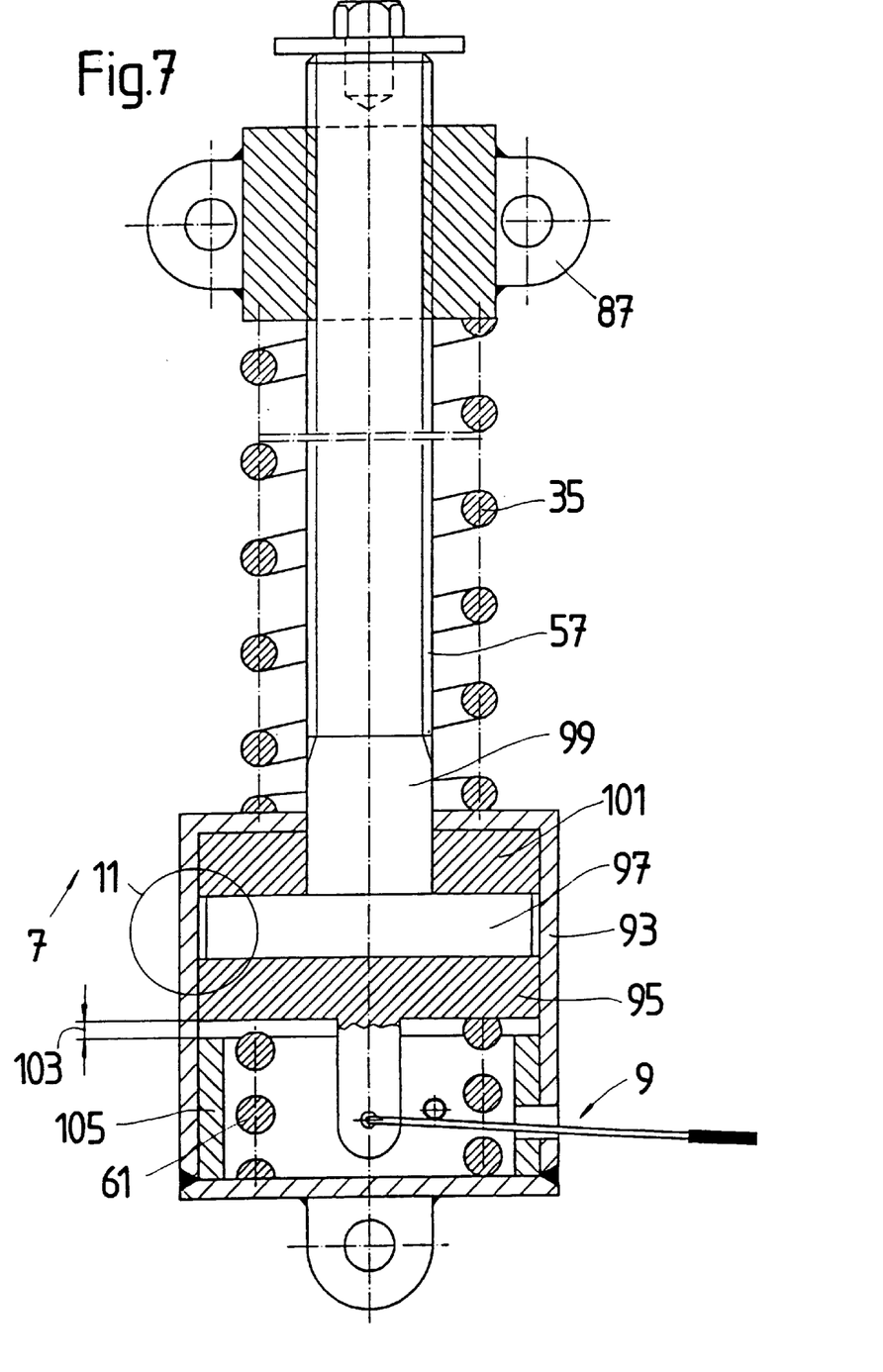

A further embodiment of a detent device is shown in FIG. 7. In a housing 93 is located the locking mechanism 11, which consists of a clutch plate 95 that is axially movable by an actuating mechanism 9, for example by means of a lever rod. A clutch disk 97 as the second locking element is likewise housed in the housing 93 and has a shaft 99 that has the movement thread 57. The connecting member 87 is rigidly installed on the shaft 99 in the circumferential direction, but is arranged to be axially movable on the thread 57. Between the housing 93 and the connecting member 87 on the shaft 99 is located the compression spring 35, which preloads the second locking element in the direction of extension out of the housing. Attached to the inside of a housing cover on the exit side of the shaft 99 is a clutch lining 101. In the actuation state shown, the clutch disk 97 is braced between the clutch plate 95 and the clutch lining 101, where the return spring 61 which acts on the clutch plate provides the necessary preloading force. The force on the clutch plate 95 can be relatively low since two friction surfaces are in use, one facing the clutch plate and one facing the clutch lining of the housing.

For the release position, the clutch plate 95 is moved deeper into the housing 93 by the actuation distance 103. During an axial motion of the connecting member 87 on the shaft 99, as already described, the connecting member 87 remains fixed in the circumferential direction so that the shaft turns with the clutch disk 97. The connecting member 87 and the shaft 99 form a geared spindle drive. Thus, the clutch disk can move axially into the housing as a maximum to clutch plate 95, since the clutch disk is float mounted together with the shaft. If one proceeds from the assumption that the clutch disk 97 comes to rest against the clutch plate 95, then the frictional force between the clutch disk and the clutch plate is determined by the axial contact force of the disk on the clutch plate. During a normal adjustment process, the adjustment force starts low and does not rise above a predetermined amount.

In case of an emergency, when a force peak suddenly acts axially on the shaft 99 and thus on the clutch disk 97, then, independent of the actuation state of the first locking mechanism, which is to say the clutch plate 95, the clutch disk is shifted into the housing 93 until the actuation distance 103 has been traversed. Then, the clutch disk 97 comes in contact with the clutch plate 95, where a significantly higher preloading force and thus also frictional force is in effect as a result of the force peak. The size of the force peak is proportional to the frictional force and thus the locking effect of an additional locking actuation state, which is independent of the actuation state that is adjustable at will.

So that the return spring 61 is not loaded too heavily, a stop 105 is also located in the housing so that the return spring 61 does not necessarily have to be preloaded to full compression.

What is claimed is:

1. A detent device for locking a first element and a second element against movement relative to one another, comprising a first subassembly connected to the first element, the first subassembly including a cylinder;

a second subassembly connected to the second element, the second subassembly including a piston rod and a piston received in the cylinder and defining two working chambers in the cylinder;

an operating fluid in each of the working chambers;

a first locking means selectively operable at will by an actuating mechanism for locking the first subassembly against movement relative to the second subassembly at will and for releasing the first subassembly from the second subassembly for relative movement thereof; and an additional locking means for locking the first subassembly against movement relative to the second subassembly and operating independently of the first locking means when a predetermined threshold value of the relative speed of the two subassemblies of the detent device is exceeded, the additional locking means including a fluid flow connection extending through the piston and having one end communicating with one working chamber and a second end communicating with the other working chamber, fluid flow passing through the fluid flow connection between the working chambers in both directions, and a dynamic pressure valve interposed at each end of the fluid flow connection and adapted to close the fluid flow connection in response to a difference in pressure between the fluid contained in the working chambers, each dynamic pressure valve locking in one direction of fluid flow, whereby the locking of one of the dynamic pressure valves takes effect in each direction of flow into the flow connection.

2. The detent device in accordance with claim 1, wherein each dynamic pressure valve includes a valve closure body, a valve closure surface and an opening spring.

3. The detent device in accordance with claim 1, wherein each dynamic pressure valve includes an elastic member in overlying relationship to the outlet opening of the associated end of the fluid flow connection.

* * * * *